June 13, 1961   W. R. RUDOLPH ET AL   2,988,655
REMOTE CONTROL PORTABLE DISTRIBUTION BOX
Filed March 27, 1959
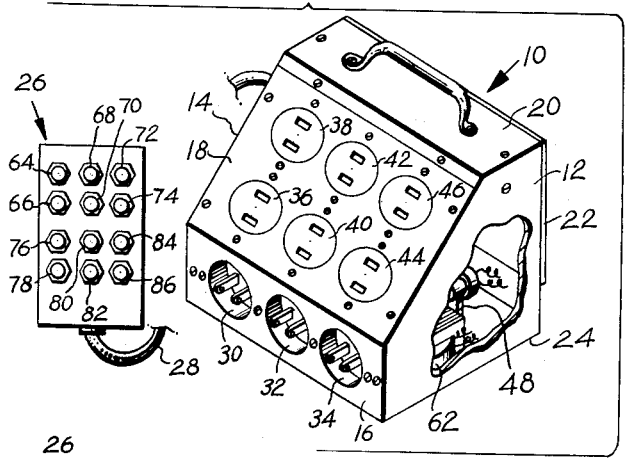
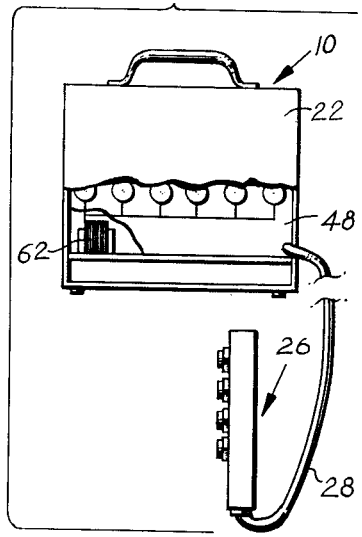

United States Patent Office 2,988,655
Patented June 13, 1961

2,988,655
REMOTE CONTROL PORTABLE
DISTRIBUTION BOX
Wallace R. Rudolph, 18 Stuyvesant Oval, New York 9, N.Y., and Karl Rodin, 320 W. 15th St., New York 11, N.Y.
Filed Mar. 27, 1959, Ser. No. 802,459
1 Claim. (Cl. 307—114)

This invention relates generally to an electrical control device and more specifically to an electrical distribution box which can be controlled from a changeable remote position.

It is a primary object of this invention to provide a portable unit which can be selectively controlled from a movable remote position to permit or retard the flow of electrical energy from one or more sources of electrical energy to output terminals where all of the distinctive sources of electrical energy utilized function as a single source of electrical energy.

It is also an object of this invention to provide a portable control distribution box which is reliable in operation and economical to build.

Other objects and many of the attendant advantages of this invention will be readily appreciated as the apparatus becomes better understood by reference to the following detailed description when considered in connection with the accompanying drawings wherein:

FIG. 1 is an isometric view of structure in accordance with the principles of this invention illustrating the distribution box with a portion of one side cut away, and also illustrating the light weight control unit which selectively activates or deactivates output connectors;

FIG. 2 is a side view of the control unit, and a rear-view of the distribution box with a portion of the rear panel cut away; and FIG. 3 is a circuit diagram in accordance with the principle of this invention.

Similar reference characters refer to similar parts throughout the several views of the drawings.

With reference to FIG. 1, two side plates, 12, 14; a front vertical panel 16; a front angled panel 18; a top plate 20, a back plate 22, and a bottom plate 24, are secured together by screws, solder, or the like to form a shell, a distribution box 10. A control unit 26 supports a number of push button switches. A cable 28 connects the control unit 26 to the distribution box 10.

The front vertical panel 16 supports three male input connectors or power input terminals 30, 32, and 34; and the front angled panel 18 supports six female output connectors or power output terminals 36, 38, 40, 42, 44, and 46. A relay support member 48 positioned vertically within the distribution box 10 is secured rigidly to the two side plates 12 and 14 by solder, screws or the like. The relay support member supports six remote control relays 50, 52, 54, 56, 58, and 60 arranged in a row across the member 48 from one side plate 12 to the other side plate 14, and positioned to present the low potential terminal wires to the rear of the distribution box 10, and the high potential terminal wires to the front of distribution box 10. There is one remote control relay for each female output connector. A transformer 62 is secured to the internal side of side plate 12 by screws or the like.

The control unit 26 supports a number of control switches, one for each individually controllable female output connector. In the embodiment disclosed there are six female output connectors, each to be individually activated and deactivated. Therefore, the control unit 26 supports six pairs of single pole single throw push button control switches 64, 66; 68, 70; 72, 74; 76, 78; 80, 82; and 84, 86. It is to be understood, however, that toggle switches—or the like, can be substituted for the push button switches without altering the operation of this invention. The button switches supported by the control unit 26 are connected electrically to the remote control relays positioned within the distribution box 10 through a single cable 28 which is composed of thirteen distinctive electrical conductors, one of which is a common. Each of the electrical conductors is made from stranded wire to provide a cable 28 having relatively good flexibility and being resistant to breaking from flexing and kinking.

With reference to FIG. 3, there is shown a circuit diagram in accordance with the principles of this invention. In this figure three separate circuits each having two output connectors is shown for convenience. It is to be understood, however, that the number of separate circuits, and the number of output connectors in each circuit can be increased or decreased to fit any desired situation. Each push button switch contains a movable contact, and a stationary contact. The movable contact of each switch is connected through a common conductor 88 to one terminal 90 of the secondary winding 94 of the transformer 62. The other terminal 92 of the secondary winding 94 is connected to the common control terminal C of each of the relays 50, 52, 54, 56, 58 and 60. Each relay supports in addition to the common control terminal C, an activating control terminal A, a deactivating control terminal D, and two power terminals. Each relay can assume one of two conditions or states, one when there is a conductive path between the two power terminals, and the other when there is a non-conductive path between the two power terminals. In the operation of the relays, the application of a single pulse signal between the common C, and activated A control terminals of a relay will condition that relay to present a conductive state between the power terminals until a pulse signal is applied between the common C and deactivating D control terminals to condition the relay to present a non-conductive state between the power terminals. The application of a continuous signal is not required to maintain the relay in a given state; once having been driven to a selected state by a pulse signal, the relay will maintain that state until another pulse signal is generated to set the relay to its other state. Remote control relay #RR3 manufacured by General Electric was found to operate in a satisfactory manner, it being understood, however, that any other controllable two position relay can be used.

The common control terminal C of each relay is connected to the terminal 92 of the secondary winding 94 of the stepdown transformer 62. The stationary contact of each switch 64, 68, and 72 is connected to the activating control terminal A of each relay 50, 52, and 54, respectively; and the stationary contact of each switch 66, 70, and 74 is connected to the deactivating control terminal D of the relays 50, 52, and 54 respectively. In a like manner, the stationary contact of each switch 76, 80 and 84 is connected to the activating control terminal A of each relay 56, 58, and 60 respectively; and the stationary contact of each switch 78, 82 and 86 is connected to the deactivating control terminal D of the relays 56, 58, and 60 respectively.

The common electrical conductor 88, and each conductor connecting a switch stationary contact to a relay control terminal are, preferably, of stranded wire to form a more flexible conductor, and they are all grouped together to form a single cable 28 (FIG. 1) having thirteen separate conductors.

The male input connector 30 is connected in parallel with the primary winding 96 of the transformer 62; in parallel with the female output connector 36 which is connected in series with the power terminals of the relay 56, and also in parallel with the female output connector 38 which is connected in series with the power terminals of the relay 50. In a similar manner, the male input connector 32 is connected in parallel with the female output connector 40 which is connected in series with the power terminals of the relay 58, and also in parallel with the female output connector 42 which is connected in series with the power terminals of the relay 52. In a like manner the male input connector 34 is connected in parallel with the female output connector 44 which is connected in series with the power terminals of the relay 60, and also in parallel with the female output connector 46 which is connected in series with the power terminals of the relay 54.

In operation, the distribution box 10 is positioned at a convenient location and coupled to a source of potential 102 by means of a power cable 100 which plugs into the male input connector 30. If the power demands of the units fed by the six female output connectors 36–46 are not greater than the output capacity of the source of electrical energy 102, then additional connector cables 100 can be used to connect the source of electrical energy 102 to each of the male input connectors 30, 32, and 34 simultaneously. However, if the power demands of the units fed by the six female output connectors 36–41 are greater than the output capacity of the single source of electrical energy 102, then three distinct sources of electrical energy 98 can be substituted for the one source of electrical energy 102, one source being connected to each of the male input connectors 30, 32, and 34. An example of this would be where a particular location has three separate twenty ampere circuits, and six electrical units are to be controlled where each unit draws ten amperes. In this example, each of the male input connectors 30, 32, and 34 would be connected to a separate circuit, and all of the six electrical units could be operated simultaneously without fear of overloading a circuit. However, if any one circuit could deliver sixty amperes, then each of the male input connectors 30, 32, and 34 could then be connected to a single circuit. The energy consuming units such as lights, motors, or the like, are connected to the female output connectors or output terminals 36–46. It is to be noted that the transformer 62 can only be energized by a source of energy connected to the input terminal 30, therefore, if only one or two output terminals are used the source of electrical energy must be connected to the input terminal 30. The control unit 26 is small enough, and light enough to be carried easily in one hand, and the cable 28 can be of any convenient length which will give extreme mobility to the operator while he is operating this invention. In practice, a cable carrying fourteen conductors and having an external diameter of only one-quarter of an inch was used.

To permit and interrupt the flow of electrical energy to the output terminals 38 and 42, the operator merely depresses or operates the switches 64 and 68. However, if the units connected to the output terminals 36 and 38 draw more electrical energy than a single source of electrical energy 102 is capable of delivering, the operator merely connects a separate source of electrical energy to each of the input connectors 30, 32. In this manner, two small sources of electrical energy can be utilized, each to satisfy the power demand of each circuit as each circuit is indepenedent of each of the other circuits. However, care should be exercised to insure that each individual source of electrical energy is capable of satisfying the needs of its individual circuit.

Thus, it can readily be seen that not only can huge power requirements be controlled easily by means of a small, light-weight hand unit that is portable in nature, but individual circuits or sources of electrical energy can be combined as separate sources to satisfy power requirements that could not be satisfied by any one of the available single circuits, and still function as a single circuit.

Obviously many modifications and variations of the present invention are possible in the light of the above teachings. It is, therefore, to be understood that within the scope of the appended claim the invention may be practiced otherwise than as specifically described.

What is claimed is:

A portable distribution device to selectively control the distribution of energy from a first and a second source of electrical energy comprising a first power input terminal, a first power output terminal, a first relay interposed between said first power input terminal and said first power output terminal, a stepdown transformer fed by said first source of electrical energy through said first power input terminal, a second power input terminal, a second power output terminal, a second relay interposed between said second power input terminal and said second power output terminal, a first control switch interposed between said stepdown transformer and said first relay to couple said first source of electrical energy to said first power output terminal through said first power input terminal, a second control switch interposed between said stepdown transformer and said first relay to uncouple said first source of electrical energy from said first power output terminal, a third control switch interposed between said stepdown transformer and said second relay to couple said second source of electrical energy to said second power output terminal through said second power input terminal, and a fourth control switch interposed between said stepdown transformer and said second relay to uncouple said second source of electrical energy from said second power output terminal.

References Cited in the file of this patent

UNITED STATES PATENTS

| 2,770,061 | Marcy | Nov. 13, 1956 |
| 2,778,957 | Fuchs | Jan. 22, 1957 |

OTHER REFERENCES

G.E. publication "Remote Control Wiring System."